United States Patent

Hough

[11] Patent Number: 6,110,353

[45] Date of Patent: *Aug. 29, 2000

[54] HOUSING AND METHOD THAT PROVIDE EXTENDED RESIDENT TIME FOR DISSOLVING GENERATED OXYGEN INTO WATER

[75] Inventor: Gary S. Hough, Woodinville, Wash.

[73] Assignee: H20 Technologies, Ltd., Philadelphia, Pa.

[*] Notice: This patent is subject to a terminal disclaimer.

[21] Appl. No.: 09/315,385

[22] Filed: May 18, 1999

Related U.S. Application Data

[63] Continuation of application No. 08/827,873, Apr. 11, 1997, Pat. No. 5,911,870.

[51] Int. Cl.⁷ .................................................. C02F 1/461
[52] U.S. Cl. .......................... 205/701; 205/742; 205/756; 204/274; 204/275
[58] Field of Search .................................. 205/701, 742, 205/756; 204/274, 275

[56] References Cited

U.S. PATENT DOCUMENTS

| | | | |
|---|---|---|---|
| 2,468,357 | 4/1949 | Brown | 204/248 |
| 2,864,750 | 12/1958 | Hughes, Jr. et al. | 204/149 |
| 3,523,891 | 8/1970 | Mehl | 210/44 |
| 3,654,119 | 4/1972 | White et al. | 204/228 |
| 3,728,245 | 4/1973 | Preis et al. | 204/275 |
| 3,819,504 | 6/1974 | Bennett | 204/289 |
| 3,865,710 | 2/1975 | Phipps | 204/228 |
| 3,925,176 | 12/1975 | Okert | 204/152 |
| 3,943,044 | 3/1976 | Fenn, III et al. | 204/149 |
| 4,017,375 | 4/1977 | Pohto | 204/255 |
| 4,119,517 | 10/1978 | Hengst | 204/229 |
| 4,132,620 | 1/1979 | Nidola et al. | 204/242 |
| 4,160,716 | 7/1979 | Wiseman | 204/270 |
| 4,180,445 | 12/1979 | Bennett et al. | 204/129 |
| 4,312,736 | 1/1982 | Menth et al. | 204/255 |
| 4,419,206 | 12/1983 | Frame | 204/228 |
| 4,425,216 | 1/1984 | Neymeyer | 204/270 |
| 4,436,601 | 3/1984 | Branchick et al. | 204/149 |
| 4,451,341 | 5/1984 | Miller | 204/149 |

(List continued on next page.)

FOREIGN PATENT DOCUMENTS

WO 95/21795  8/1995  WIPO .

OTHER PUBLICATIONS

The Advanced Water Systems Incorporated, company brochure regarding information on various products to improve water quality, different types of water systems and current technology, Sep. 30, 1993.

*Primary Examiner*—Arun S. Phasge
*Attorney, Agent, or Firm*—David V. Carlson; Seed IP Law Group PLLC

[57] ABSTRACT

An apparatus for increasing the quantity of dissolved oxygen in water. The apparatus includes an inlet for receiving untreated water. A cell housing having an electrolytic cell therein is coupled to the inlet. A resident time housing is connected to the cell housing for receiving water having oxygen and hydrogen gas therein. The resident time housing is vertically oriented and longitudinally tending for a selected vertical length above the cell housing. This provides sufficient resident time of the water in a quiet zone to permit the generated oxygen gas to transition into the dissolved state prior to reaching the top of the resident time housing. An outlet is provided at the top of the resident time housing. Treated water having a high dissolved oxygen content is delivered out of the outlet. A gas vent is provided at the outlet to permit the escape of hydrogen or other gases which have not been dissolved into the water. Preferably, a chill unit is provided prior to the electrolytic cell to reduce the temperature of the water to make it pleasing for human consumption and also to increase the quantity of dissolved oxygen which can enter the water. Additionally, a light or other artistic display may be provided adjacent to or with the resident time housing for the pleasure of viewers.

8 Claims, 4 Drawing Sheets

U.S. PATENT DOCUMENTS

| | | | |
|---|---|---|---|
| 4,528,083 | 7/1985 | LaConti et al. | 204/265 |
| 4,572,775 | 2/1986 | Paniagua | 204/229 |
| 4,623,436 | 11/1986 | Umehara | 204/149 |
| 4,639,303 | 1/1987 | Staab et al. | 204/258 |
| 4,761,208 | 8/1988 | Gram et al. | 204/95 |
| 4,781,805 | 11/1988 | Dahlgren | 204/149 |
| 4,783,246 | 11/1988 | Langeland et al. | 204/95 |
| 4,784,735 | 11/1988 | Sorenson | 204/98 |
| 4,790,914 | 12/1988 | Sorenson | 204/98 |
| 4,797,182 | 1/1989 | Beer et al. | 204/14.1 |
| 4,839,007 | 6/1989 | Kötz et al. | 204/149 |
| 4,917,782 | 4/1990 | Davies | 204/152 |
| 4,936,979 | 6/1990 | Brown | 210/85 |
| 5,062,940 | 11/1991 | Davies | 204/228 |
| 5,292,412 | 3/1994 | Pitton | 204/149 |
| 5,324,398 | 6/1994 | Erickson et al. | 204/149 |
| 5,328,584 | 7/1994 | Erickson et al. | 204/229 |
| 5,389,214 | 2/1995 | Erickson et al. | 204/149 |
| 5,427,667 | 6/1995 | Bakhir et al. | 204/260 |
| 5,460,702 | 10/1995 | Birkbeck et al. | 205/701 |

HOUSING AND METHOD THAT PROVIDE EXTENDED RESIDENT TIME FOR DISSOLVING GENERATED OXYGEN INTO WATER

CROSS-REFERENCE TO PRIOR APPLICATION

This application is a continuation of U.S. patent application Ser. No. 08/827,873, filed Apr. 11, 1997, now U.S. Pat. No. 5,911,870.

TECHNICAL FIELD

This invention relate to dissolving oxygen into water, and more particularly, to an improved apparatus and method that provides an extended resident time for dissolving recently generated oxygen into water.

BACKGROUND OF THE INVENTION

Many benefits may be obtained through the use of water containing an elevated quantity of dissolved oxygen For example, certain studies have shown that animals, including chickens and turkeys, may become heavier for a given grain consumption if their drinking water has elevated oxygen levels. Increased levels of oxygen and water have been shown to purify the water, removing and neutralizing a variety of biological and chemical contaminants. In addition, there are indications that humans obtain considerable health benefits by drinking water with elevated levels of dissolved oxygen.

It is well known that the oxygen content of water may be increased via electrolysis. According to known techniques, a current is supplied to a cathode and anode positioned in a water solution. A DC voltage is connected to the electrodes in the water. When current is supplied, electricity passes through the water, splitting some of the water molecules into their component parts, causing the formation of hydrogen gas and oxygen gas.

Currently available systems for oxygenating water with electrolytic cells may not reach desired levels of oxygen, nor do they function as efficiently as desired Accordingly, there is a need in the art for an improved system that increases the amount of dissolved oxygen in water at an improved efficiency.

SUMMARY OF THE INVENTION

According to principles of the present invention, an apparatus is provided for increasing the quantity of dissolved oxygen into water. The apparatus includes an inlet for receiving untreated water. A cell housing is connected to the inlet. Within the cell housing is an electrolytic cell. When power is supplied to the electrolytic cell, electricity flows through the water breaking some of the water molecules into their component parts of hydrogen gas and oxygen gas. At the outlet of the cell, both hydrogen gas and oxygen gas are present in the water. A vertically-oriented, longitudinally-extending housing is connected to the cell housing. The housing has a selected vertical length for providing a high resident time for water in the housing. The length is selected to be sufficiently long that a majority of the gaseous oxygen transitions to dissolved oxygen in the water.

The resident time housing has an open channel, which is unrestricted and with no obstructions therein. Further, in a preferred embodiment, it is a generally uniform cross-sectional area with a smooth wall to promote laminar flow. The use of an unrestricted, laminar flow zone provides a quiet time for the oxygen to transition from the gaseous state into the dissolved state.

DETAILED DESCRIPTION OF THE INVENTION

Figure 1:
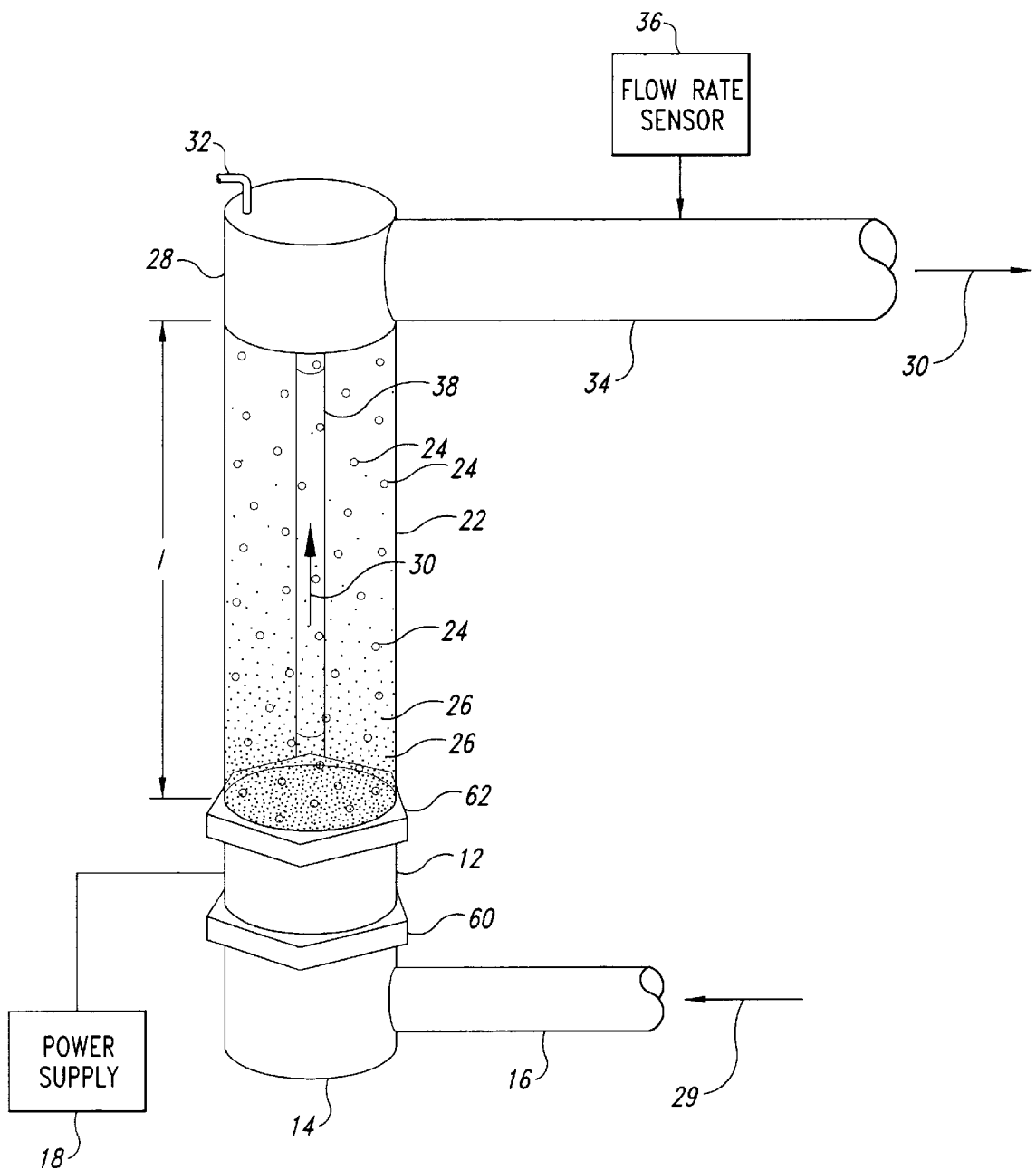
FIG. 1 is an isometric view of a first embodiment of an apparatus according to the present invention.

FIG. 1 shows the apparatus 10 for increasing the quantity of dissolved oxygen in the water. The apparatus 10 includes an electrolytic cell housing 12 having an inlet section 14 connected prior to the cell housing 12. An inlet pipe 16 is connected to the inlet 14 for receiving water flowing and is shown by direction arrow 29.

A power supply 18 is coupled to the electric cell housing 12 for providing direct current to the electrolytic cell as described in more detail later herein A resident time housing 22 is connected at the outlet of the cell housing 12. The resident time housing 22 is vertically oriented to provide a long channel through which water flows in a vertical direction The resident time housing 22 longitudinally extends for a selected vertical length above the cell 12.

An outlet 28 housing a vent 32 therein is at the top of the housing 22. An outlet pipe 34 is connected to the outlet 28 for providing a flow of treated water.

During operation, the electrolytic cell in the housing 12 has direct current power supplied thereto so as to provide a flow of electric current through the water 30 flowing therein. The passage of electric current causes some of the water molecules to split into their component parts creating hydrogen gas and oxygen gas. At the outlet of the electrolytic cell, the hydrogen gas, represented by the large bubbles 24 and the oxygen gas, represented by the small bubbles 26, exit from the electrolytic cell. Both the hydrogen gas 24 and the oxygen gas 26 are, at this time, mainly in the gaseous state. Hydrogen bubbles 24 are generally lager and more likely to remain separated from the water itself Oxygen bubbles, on the other hand, are quite numerous and create a cloud effect immediately at the exit of the electrolytic cell 12. Both the hydrogen and oxygen, at this stage being in gaseous form, begin to rise in the water. In addition, the water is usually moving through the tube as shown by direction arrow 30. In some embodiments, the water may be stationary and even in those embodiments, the gases will still rise slowly through the rube, the gas being lighter than the water.

As the oxygen 26 rises through the resident time housing 22 it will transition from a gaseous state to a dissolved state, greatly reducing the number of separate oxygen gas molecules therein. The length 1 is selected to be sufficiently long that a majority of the oxygen molecules become dissolved oxygen in the water. On the other hands the hydrogen molecules we more likely to remain in the gaseous state through the entire length of the tube and thus will remain in the gaseous form as shown by bubbles 24.

Accordingly to principles of the present invention, the resident time housing 22 is a straight, longitudinally-extending tube with an unrestricted cross-sectional area. This permits water to pass therethrough in laminar flow without encountering obstructions. This provides a quiet zone which permits the oxygen molecules to more easily be dissolved into the water. If the resident time housing 22 is made too short, the housing will terminate before a majority of the oxygen has dissolved into the water and will thus be exposed to surface air and exit in the gaseous form, rather than becoming dissolved in the water. Further, if turbulence is induced in the water, such as by having a sharp turn, a 90° elbow, or other obstructions immediately after the cell before sufficient quiet time has been permitted, then the oxygen will be inclined to remain in the gaseous state and not transition to dissolved oxygen. A shortcoming of many prior art devices is the presence of such obstructions, including sharp bends in the pipe, filters or other devices shortly after the electrolytic cell 12 which act as obstructions to prevent the rapid transition of the oxygen 26 into the dissolved state within the water.

According to one embodiment of the present invention, the distance 1 is selected to be in the range of 3 to 6 feet, 4 feet being the preferred range. The diameter of the resident time housing 22 is in the range of 3–4 inches in one embodiment In other embodiments, a smaller diameter tie is used. With such a housing length and diameter, flow rates in the range of 2 to 6 gallons per minute can be achieved while achieving high dissolved oxygen values. Thus, even at very high flow rates, such as 6 gallons per minute, the resident time of the water inside the housing 22 is sufficiently long that during this quiet period a majority of the generated gaseous oxygen transitions into the dissolved state so that the water exiting the top of the housing has a relatively high dissolved oxygen percentage.

As will be appreciated the length 1 that is optimum, is related to the flow rate desired, as well as the diameter of the tube and other factors. For a very low flow rate, a shorter length I is acceptable cause the water will have sufficient resident time that a majority of the oxygen can transition into dissolved oxygen. On the other hand, for higher flow rates, a longer length will be desired The desired feature of the invention is to maintain a resident time of the water prior to encountering a 90° bend in the flow or other turbulence-creating member such that the gaseous oxygen may be rapidly dissolved to become dissolved oxygen.

The outlet 28 has a vent 32 connected thereto permitting hydrogen gas to escape at the top of the outlet 28. Any other gases which remain in gaseous form at the outlet 28 will also be permitted to escape via vent 32. However, since a majority of the oxygen has transitioned to the dissolved awe, it will be retained in the water and will not escape via vent 32. The treated water 30 then passes to an outlet pipe 34 where it is provided to the consumer. If desired, a flow rate sensor 36 may monitor the rate at which treated water is provided to a user. If the water is flowing at an extremely high rate, the flow sensor may provide feedback to the power supply to increase the current or, conversely, if the flow rate is extremely low or zero, may reduce the current or turn it off as desired. The flow rate sensor 36 can be positioned at any desired location, including prior to the inlet 16, or other positions as desired by the user, it being shown only schematically for purposes of illustrating the ability to sense the flow and provide feedback if necessary.

The treated water 30 is thereafter provided to any desired user, which may include poultry, such as chickens and turkeys. Alternatively, it may also be provided to an outlet tap for human consumption.

According to one embodiment, the resident time housing 22 is clear so that a person may easily see the various gases inside the housing. A light 38 is provided immediately behind the housing. The light 38 transmits light directly through the water 30 being treated so that an operator may see the hydrogen gas 24 and oxygen gas 26 within the water 30. This provides feedback to the operator to confirm that the majority of the gaseous oxygen 26 is transitioned to the dissolved state prior to reaching the outlet 28. Further, light 38 it provides visual stimulation and an artistic enjoyment for viewers. The generation of many different sized bubbles, and their passing at different speeds through the water as the water is also traveling through the tube creates a dancing effect of the bubbles, which has a pleasing effect to the eye of the viewers. This provides a distinct advantage in those situations where the water is being provided for human consumption. The person consuming the water has the advantage of confirming that oxygen is in fact being generated by the electrolytic cell. Further, he/she can confirm that the majority of the oxygen generated has transitioned into the dissolved state while at the same time having the enjoyment of viewing the artistic effect of the various bubbles as they are created and passed through the system. The use of this device, not only as an oxygen generator, but also as an artistic device for entertainment, is a significant advantage which is not obtainable in the prior art. Further, the immediate feedback to the user that the invention is achieving the desired result provides not only satisfaction and enjoyment but the assurance that a high-quality product is being properly delivered This has significant commercial benefit for the sale of such water, as will be described with respect to the next embodiment.

Figure 2:
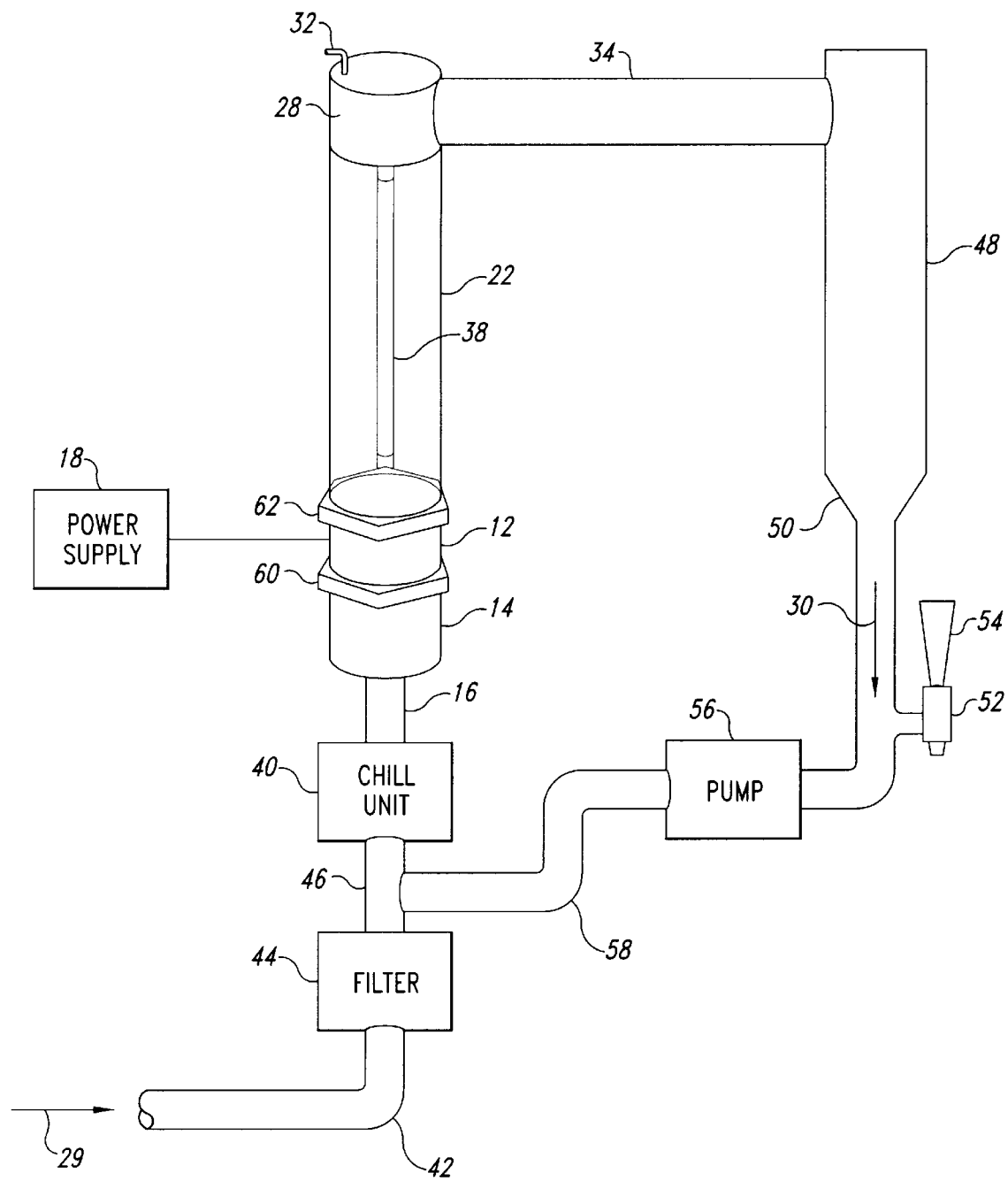
FIG. 2 is an isometric schematic view of an alternative embodiment according to principles of the present invention.

FIG. 2 illustrates an embodiment which is more particularly suited for the delivery of oxygenated water for human consumption and viewing enjoyment As with the device of FIG. 1, a cell housing 12 is coupled at one end to an inlet 14 and at the other end to an outlet 28. A vent 32 permits hydrogen gas to be vented. The resident time housing 22 is clear and has a light 38 at the back thereof. The bubbles 24 and 26 are present, however, they are not shown in this figure, to provide a more clear illustration of the structure and operation of the present invention Prior to the inlet 14, a chill unit 40 is provided in the inlet pipe 16. The purpose of the chill unit 40 is to reduce the temperature of the water to a low temperature level to provide enjoyable drinking for human consumption It also has the distinct advantage of significantly increasing the amount of dissolved oxygen which the water 30 can retain, as explained in more detail elsewhere herein.

Untreated water is provided as shown by the arrow 29 into an inlet pipe 42. The untreated water passes through a filter 44 to ensure that all contaminants and undesired gases are removed therefrom. Preferably, the filter is of the activated charcoal type or other type which is known to remove chlorine gas and other substances. The water then passes from the filter 44 into a transition pipe 46. From the transition pipe 46 it passes into the chill unit 40 where it is reduced to a cool temperature for drinking.

The chill unit 40 may be of any type which is currently available in the market today, such chill units being well known For example, in the delivery of beer or other tap beverages, a chill unit is often provided in the flow line, which includes a heat exchanger surrounded by ice or other temperature-reducing material. This will reduce the temperature of the water flowing therethrough to a desirable drinking temperature without freezing it. A refrigeration unit, such as the type powered by a motor and having a heat exchanger may also be used if desired.

The water passes from the chill unit 40 into the inlet tube 16, the inlet 14, and then through the electrolytic cell in the housing 12. The electrolytic cell generates hydrogen and oxygen gases as has been previously described. The water 30, containing dissolved oxygen passes from the outlet 28 into an outlet pipe 34. From the outlet pipe 34 the water is delivered to a consumer supply tube 48. Generally, the consumer supply tube 48 will have a smaller diameter than the resident time housing 22, such as ¾ of an inch, ½ inch, or less. By this time, the majority of the oxygen has entered dissolved state and thus the tube diameter can be restricted. However, a gradual diameter reducer 50 is preferred so as to maintain a generally laminar flow and keep a substantial portion of the oxygen in the dissolved state. It may also be reduced in steps by having one or more reducers 50. Thereafter, the treated water 30 is delivered to a tap 52.

The tap 52 is operated manually by a user so as to provide drinking water from the system. The tap 52 may be of any conventional type known in the art. For example, it may be of the type normally used for the dispension of beer or other carbonated beverages having the appropriate flow valves and lever 54 thereon so as to maintain the gas in the dissolved state. Such flow valves are well known in the art, being used for the dispension of carbonated beverages, beer, and other liquids. The user, or a waiter serving the user, is thus able to easily place the oxygenated water into a glass or pitcher for consumption.

Generally, water will not be constantly drawn from the valve 52. Rather, it will be removed as demanded by a user. Accordingly, it is desired to maintain the water in constant circulation so that it remains sufficiently chilled to be comfortable for drinking. According to one embodiment of the invention, a small pump 56 causes recirculation of the water through a recirculation tube 58 into the transition pipe 46. The water thereafter enters to the chill unit and is returned to a low temperature prior to passing through the cell housing and having its dissolved oxygen content increased as has been described.

Having the water at a low temperature prior to entering through the cell housing significantly improves the dissolved oxygen properties of the water. Cold water is capable absorbing significantly greater amounts of gases, including oxygen gas. Further, the chilled water can absorb the oxygen gas more rapidly and maintain a higher dissolved oxygen content than warm water. Chilling the water prior to it entering the electrolytic cell provides the advantage that the gas will be more rapidly absorbed into the water and further, that the water can hold a higher quantity of the dissolved oxygen than is possible at a higher temperate. The chill unit 40 thus provides an improved drinking beverage for human consumption and also the advantage of increased dissolved oxygen quantities and at a faster rate than is possible without the chilling.

As will be appreciated, the device of FIG. 2 is of a type which would normally be installed in a restaurant, bar, or other location so as to provide high-quality water with a substantial dissolved oxygen content. Often, the customers wish to view the generation of the treated water and the dissolving of oxygen gas into the water. The housing 22 is therefore made aesthetically pleasing and the light 38 is selected to be of the type which will provide pleasant viewing. The light 38 can, of course, be a single light of a selected color. Alternatively, a variety of different-colored lights switch on and off in a selected pattern or sequence so as to create an artistic appeal. Thus, the light 38 represents any number of different types of lights, as well as different colors so as to provide the desired artistic visual effect while at the same time the generation of high quantities of dissolved oxygen in the water.

An additional benefit of the present invention will now be described with respect to FIG. 1. As shown in FIG. 1, a removable coupling 60 is positioned at a bottom portion of the electrolytic cell 12. Further, a removable coupling 62 is positioned at a top portion of the electrolytic cell. The removable couplings are significant advantages in providing service and cleaning of the electrolytic cell 12 and the housing 22. When it is desired to service the electrolytic cell 12, such as cleaning the electrodes, replacing or servicing any of the components or the like, operation of the system is terminated and water is drained from the system The couplings 60 and 62 are then rotated so as to separate the electrolytic cell 12 from the rest of the system. The cell housing 12 is thereafter removed from the system for replacement, servicing or the like is desired. Thereafter, the cell housing 12, having the new electrolytic cell or the cleaned cell therein is replaced and the couplings 60 and 62 are reattached so the system becomes fully operational. The couplings 60 and 62 can be any acceptable coupling in the prior art, including rotatable threat watertight couplings or the like, many such watertight connections being known.

Figure 3:
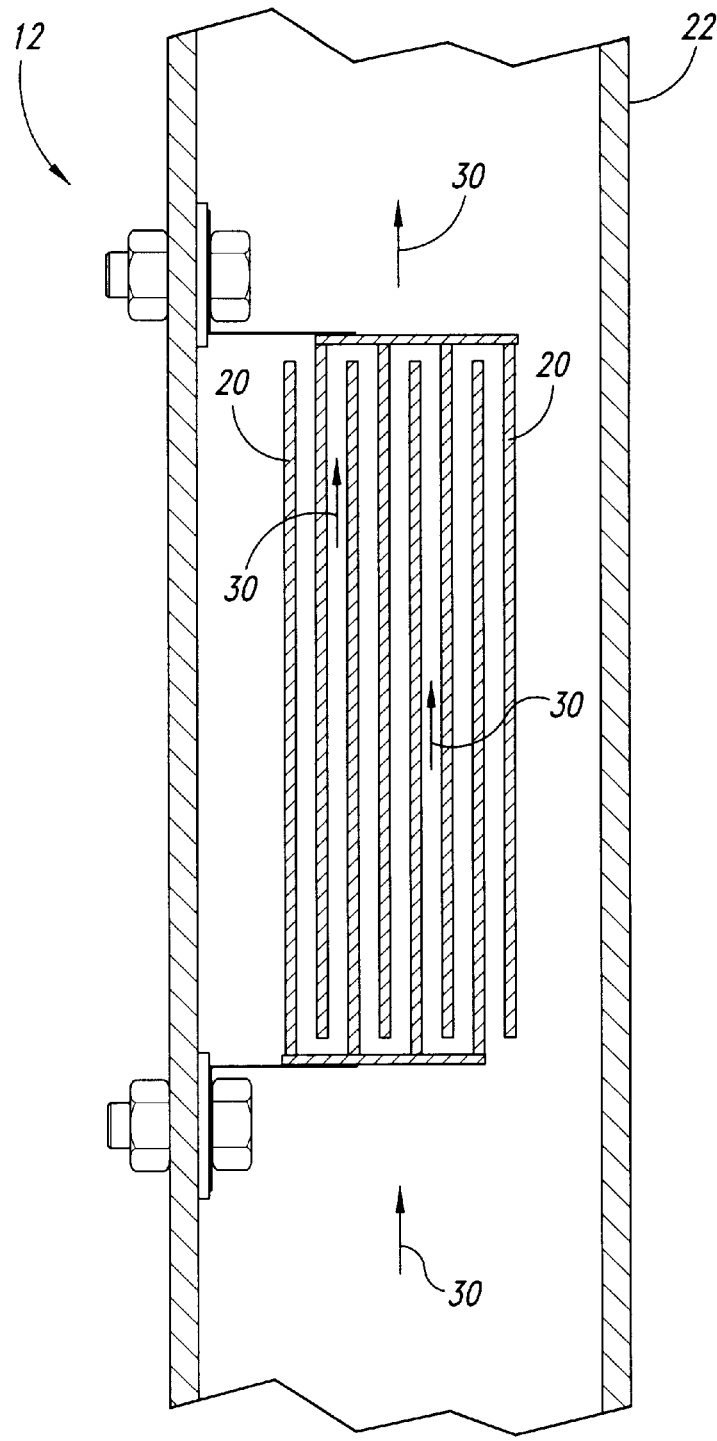
FIG. 3 is a first embodiment of an electrolytic cell according to principles of the present invention
Figure 4:
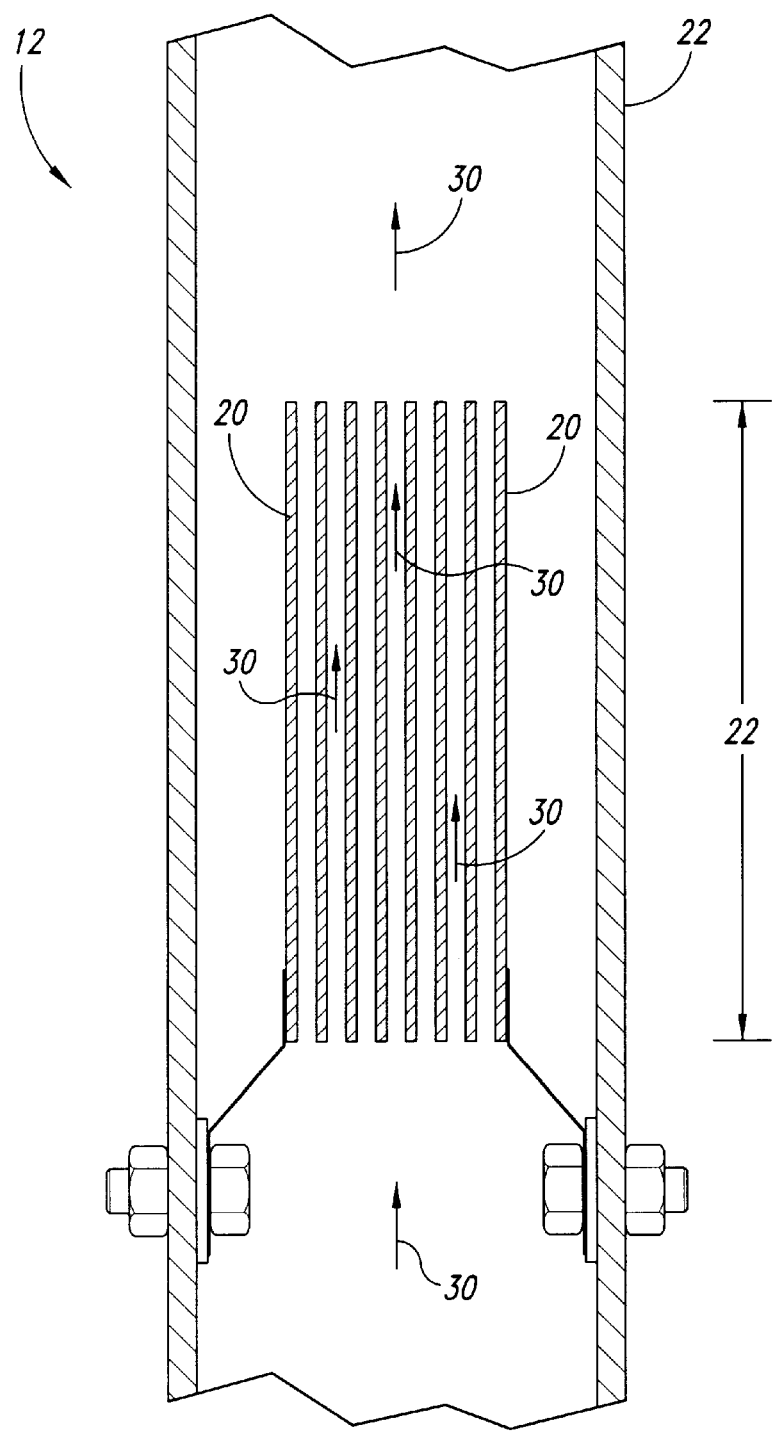
FIG. 4 is an alternative embodiment of an electrolytic cell according to principles of the present invention.

FIGS. 3 and 4 show examples of the housing 12 having an electrolytic cell therein The electrolytic cell includes electrodes 20 which are appropriately connected to the positive and negative power supplies, as is known in the art The length 23 and the number of the electrodes 20 is selected so as to provide the desired amount of oxygen generation, again according to known principles. In a preferred embodiment, the housing 12 has the same cross-sectional diameter as the resident time housing 22 so as to provide a generally smooth, laminar transition from the electrolytic cell to the resident time housing 22. Generally, the resident time housing 22 will begin immediately above the electrolytic cell so that the generated oxygen gas can begin to transition into the dissolved state In an alternative embodiment, the resident time housing 22 has a larger diameter than the cell housing 12 to provide an extended resident time for a given flow rate.

The invention has been described and shown for a number of alternative embodiments as will be appreciated, equivalent structures may be substituted for those shown rein in order to achieve the objects and purposes of the invention, the invention being as broad as the appended claims and is not limited to the specific embodiments shown herein.

What is claimed is:

1. An apparatus for increasing the quantity of dissolved oxygen in water comprising:

a water inlet;

a cell housing having an electrolytic cell therein, the cell housing being coupled to the inlet;

a resident time housing connected to the cell housing at a resident time housing inlet, the resident time housing being vertically oriented and extending vertically above the cell housing; and a water outlet at the top of the resident time housing.

2. The apparatus according to claim 1 further including:

a water delivery tube coupled to the outlet at the top of the resident time housing; and a valve coupled to the water delivery tube for removing water from the tube and replacing it in a container.

3. The apparatus according to claim 2, further including:

a water storage tube connected between the valve and the water delivery tube.

4. The apparatus according to claim 2 further including:

a water flow sensor coupled to the water delivery tube.

5. The apparatus according to claim 1, in which the resident time housing is composed of a cylinder having straight vertical walls.

6. The apparatus according to claim 1, wherein the cell housing is composed of a cylinder having straight vertical walls.

7. The apparatus according to claim 1, further including a water recirculation line coupled from the water delivery tube to the water inlet for circulating the water through the cell housing a second time.

8. The apparatus according to claim 1, further including a gas escape valve positioned vertically above the resident time housing.

\* \* \* \* \*